United States Patent
Lin

(10) Patent No.: US 7,957,468 B2
(45) Date of Patent: Jun. 7, 2011

(54) METHOD FOR PROCESSING MOTION IMAGE

(75) Inventor: Ming-Hung Lin, Hsinshu (TW)

(73) Assignee: Altek Corporation, Hsinchu (TW)

( * ) Notice: Subject to any disclaimer, the term of this patent is extended or adjusted under 35 U.S.C. 154(b) by 1521 days.

(21) Appl. No.: 11/349,132

(22) Filed: Feb. 8, 2006

(65) Prior Publication Data
US 2007/0153908 A1  Jul. 5, 2007

(30) Foreign Application Priority Data
Dec. 30, 2005 (TW) ................................ 94147774 A

(51) Int. Cl.
*H04N 7/12* (2006.01)
(52) U.S. Cl. ......... 375/240.24; 375/240.26; 375/240.12; 375/240.27
(58) Field of Classification Search .................. 375/240
See application file for complete search history.

(56) References Cited

U.S. PATENT DOCUMENTS

| 6,418,166 B1 * | 7/2002 | Wu et al. ................... 375/240.12 |
| 2004/0071217 A1 * | 4/2004 | Lin ........................... 375/240.25 |

* cited by examiner

*Primary Examiner* — Shuwang Liu
*Assistant Examiner* — Lihong Yu
(74) *Attorney, Agent, or Firm* — Rosenberg, Klein & Lee

(57) ABSTRACT

A method for processing a motion image comprises of receiving a plurality of frames of a motion image, and dividing each frame into a plurality of macro blocks. Then, one of the macro blocks defines a comparing block. The pixels in the comparing block of a current frame are processed using a SAD operation with the pixels in a macro block in a searching of the pre-frame to obtain a SAD threshold value. In addition, the present invention lets the pixels in the comparing block process a SAD operation with the macro block that has not yet been processed by a SAD operation, thus obtaining an accumulation value of a plurality of the SAD values. When the accumulation value is greater than or equal to the SAD threshold value, the SAD operation is interrupted.

2 Claims, 4 Drawing Sheets

METHOD FOR PROCESSING MOTION IMAGE

BACKGROUND OF THE INVENTION

1. Field of the Invention

The present invention relates to a method for processing motion images, and, in particular, relates to a method for processing motion images using Sum of Absolute Differences (hereunder referred as SAD).

2. Description of the Related Art

Motion images are composed of a plurality of static frames. When quickly switching sequentially between a plurality of static images, due to the principle of visual persistence, it seems the images are moving.

Digital visual streams acquired from digital cameras usually comprise unwanted motions in consecutive frames. So-called unwanted motions might be caused by swings when cameras retrieve videos. To eliminate such unwanted motions, it is required thus to adopt optical, mechanical or other electronic solutions, so as to detect and correct such unwanted motions. However, these methods are expensive and complicated. Furthermore, these methods cannot resolve unwanted motions in motion image streams generated by special effects. To stabilize motion image streams, several digital process methods have been thus developed.

Among such process methods, one uses calculations of absolute differences as a method to produce motion image processes. Firstly, two retrieved images are mutually subtracted to find the sum of absolute difference, i.e. SAD, and find correlations between the two images according to the minimal SAD; that is, the method looks for motion tracks of two images, and uses such motion tracks to perform image processes on these two images.

Whereas, well-known SAD operation methods require calculations on each pixel within the two images, thus it will consume most time in computing.

SUMMARY OF THE INVENTION

Therefore, the present invention provides a method for processing motion images, which enables fast processes on motion images, and does not require expensive costs.

The method for processing motion images can handle motion images. Therein, motion images are composed of a plurality of consecutive frames, and each frame comprises a plurality of pixels. The process method of the present invention includes receiving all frames sequentially, and dividing each frame into several macro blocks. For each macro block there is a predetermined number of pixels. In addition, the present invention defines one macro block in each current frame as a comparing block, and performs SAD operations on pixels in the said comparing block and pixels in one of the macro blocks of a searching window in pre-frame, thus obtaining a SAD threshold value, wherein the searching window contains a predetermined number of macro blocks. Moreover, the present invention performs SAD operations on pixels in the comparing block and pixels in the macro blocks that have not yet undergone SAD operations within the searching window. Thus an operation value is obtained. Here, such an operation value is the accumulated sum of the SAD values generated when SAD operations are performed on each pixel in the macro block. When the accumulated SAD value becomes greater than or equal to such the SAD threshold value, it will immediately interrupt the SAD operation, and when the accumulation value of the SAD values of all pixels within the macro blocks which perform SAD operations become smaller than the SAD threshold value, the SAD threshold value will be updated with the operation value obtained from the currently performed SAD operation.

In the embodiment of the present invention, the comparing block will first perform SAD operations on the pixels situated at the image edges within the macro blocks in the searching window. Then an SAD threshold value will be obtained.

In addition, the present invention further includes acquisition of a motion vector of the comparing block in each frame, according to the SAD threshold value, and by means of the motion vector of the comparing block in each frame, obtaining motion tracks of these consecutive frames. Furthermore, the present invention will determine, in each frame, if the angle between the motion vector of the comparing block and the motion track is greater than a predetermined angle. If there are any frames in which the angle between the motion vector of the comparing block and the motion track is greater than such predetermined angle, parameters for the frame will be adjusted, so as to make the motion vector of the comparing block approach the motion track, and to smoothen the motion track.

In a preferred case, the above-mentioned predetermined angle can be set by users themselves.

While the present invention is performing SAD operations on the macro blocks in the searching window, as soon as the accumulation value of the SAD values becomes greater than the SAD threshold value, it will immediately interrupt computation operations so as not to consume too much time. In addition, the present invention allows users to set up a predetermined angle as the basis for deciding whether it is necessary to correct the motion vector of the comparing block, the present invention, as a result, can flexibly deal with motion vectors generated due to special effects.

It is to be understood that both the foregoing general description and the following detailed description are exemplary, and are intended to provide further explanation of the invention as claimed. Other advantages and features of the invention will be apparent from the following description, drawings and claims.

DETAILED DESCRIPTION OF PREFERRED EMBODIMENTS

Figure 1:
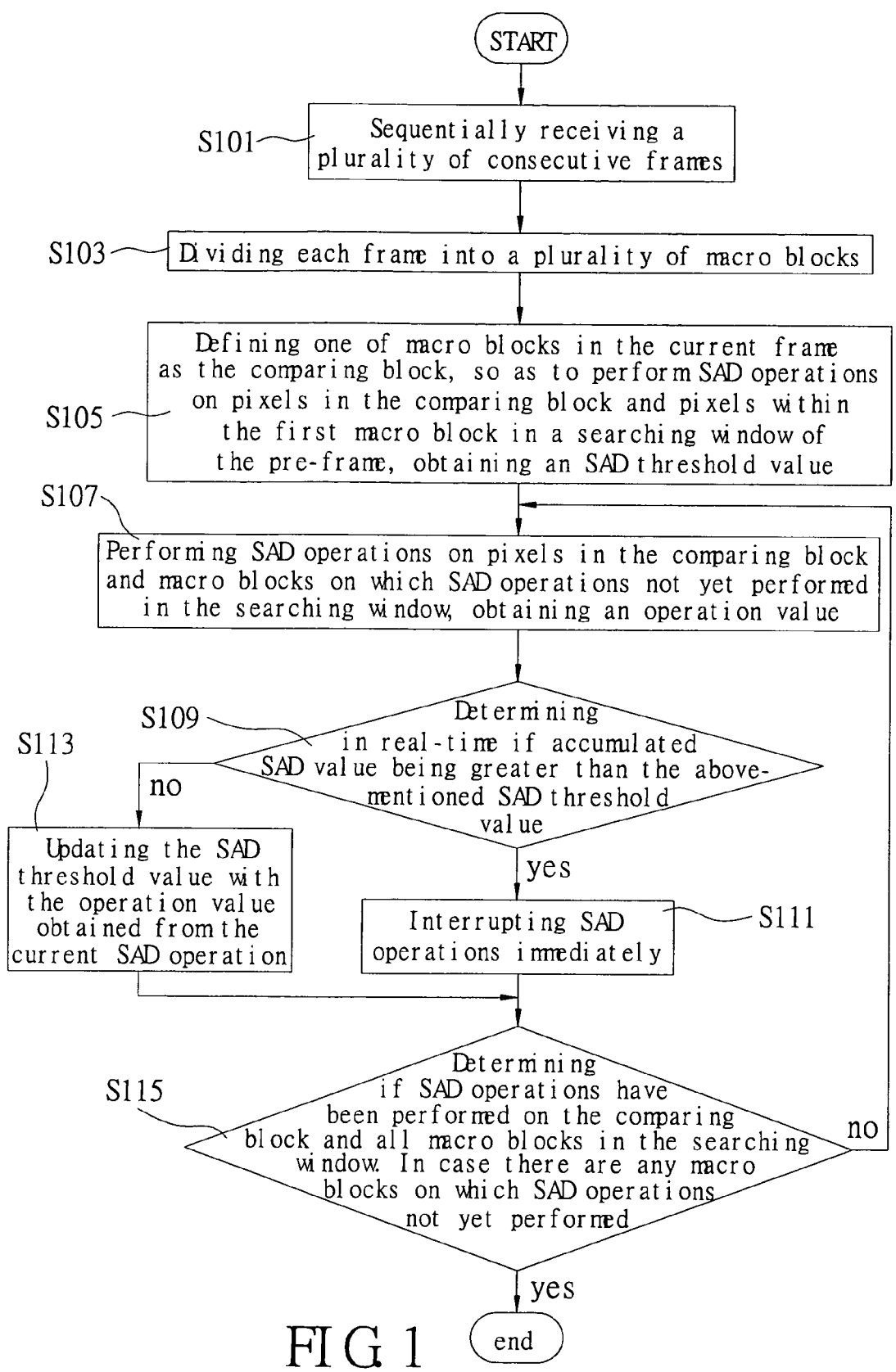
FIG. 1 shows a step flowchart of the method for processing motion images, in accordance with one preferred embodiment of the present invention.

FIG. 1 shows a step flowchart of the method for processing motion images, in accordance with one preferred embodiment of the present invention. Now referring to FIG. 1, as is well known, a motion video is composed of several consecutive frames, and each frame has a plurality of pixels forming an image in each frame. The method for processing motion images provided by the present invention handles, in a motion video, noises or external factors (caused by hand-trembling, for example) which thus deteriorate the quality of motion images.

Please continue to refer to FIG. 1, in which the present invention initially, as illustrated in Step S101, receives several consecutive frames, and these consecutive frames form a motion video. Since there are a plurality of pixels contained in each frame, they can thus be arranged in an array. Therefore, the present invention divides each frame into a plurality of macro blocks, as illustrated in Step S103. Here, each macro block contains a first predetermined number of pixels.

Next, as illustrated in Step S105, the present invention defines one macro block in the current frame as a comparing block, so as to perform SAD operations on the pixels in such a comparing block and pixels within the first macro block in a searching window of the pre-frame. Thereby, an SAD threshold value is obtained. As is well known, the searching window contains therein a second predetermined number of macro blocks.

Figure 2:
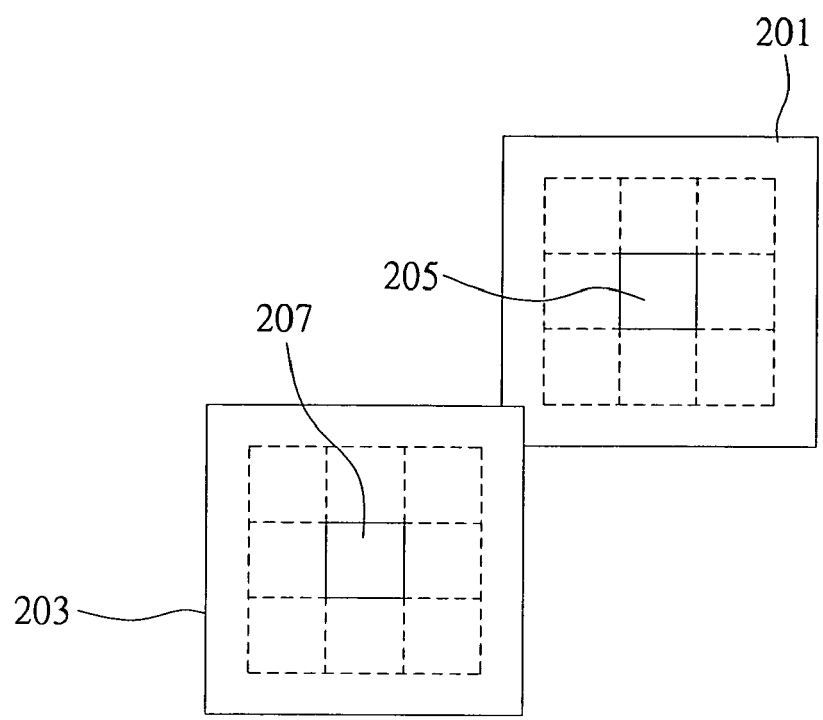
FIG. 2 shows a diagram illustrating the performance of the SAD operations on pre-frame and the current frame.

FIG. 2 shows a diagram illustrating the performance of the SAD operations on a pre-frame and the current frame. It is assumed 201 represents the current frame, while 203 represents the pre-frame. Here the frame 201 is defined as ith frame, and 203 is defined as i−1th frame. It is assumed that, within the ith frame 201, a macro block 205 is selected as the comparing block. Thus, the present invention will perform SAD operations on the comparing block 205 and one macro block within the searching window (i.e. represented by 3×3 grids in the i−1th frame 203) of the i−1th frame 203 (here assumed to be 207), acquiring an SAD threshold value. The comparing block will perform SAD operations first on pixels over image edges within macro blocks in the searching window.

Now returning to FIG. 1, after the present invention has obtained the SAD threshold value, as illustrated in Step S105, in Step S107, it performs SAD operations on pixels in the comparing block and macro blocks on which SAD operations have not yet been performed in the searching window, thus obtaining an operation value. A so-called SAD operation value is the accumulation value obtained from accumulation of the SAD values derived from SAD operations.

Specifically, in the present invention, Step S109 will be performed while the macro blocks are performing the SAD operation. It will immediately determine whether an accumulated SAD value is greater than the above-mentioned SAD threshold value. It is assumed that, when a macro block performs SAD operations, the present invention determines that the accumulated SAD value becomes greater than or equal to the above-mentioned SAD threshold value. Then, as illustrated in Step S111, SAD operations will be directly interrupted, and there will be no need to perform SAD operations on any remaining pixels. Hence, the present invention can effectively reduce the SAD operation time.

On the other hand, in case SAD operations have been performed on all the pixels of a macro block, but an accumulation value that is smaller than the SAD threshold value has been found, the present invention will, as illustrated in Step S113, update the SAD threshold value with the acquired operation value from the current SAD operation. After completing Step S111 or S113, the present invention will, as illustrated in Step S115, determine if SAD operations have been performed on the comparing block and all macro blocks in the searching window. In case there are any macro blocks on which SAD operations have not yet been performed (i.e. "NO" indicated in Step S115), Steps marked as S107 etc. will be repeated.

The purpose of an operation flow as depicted in FIG. 1 is to search for the minimal SAD threshold value, so as to find corresponding macro blocks in these two frames. The motion vectors are then calculated between these corresponding macro blocks, steps thereof will be further described in FIG. 4.

In the present invention, when performing SAD operations on the comparing block and macro blocks in the searching window, the present invention will choose more significant image edges in the macro blocks to perform SAD operations first. For example, the present invention will select pixels located at image edges in macro blocks to perform SAD operations first.

Figure 3:
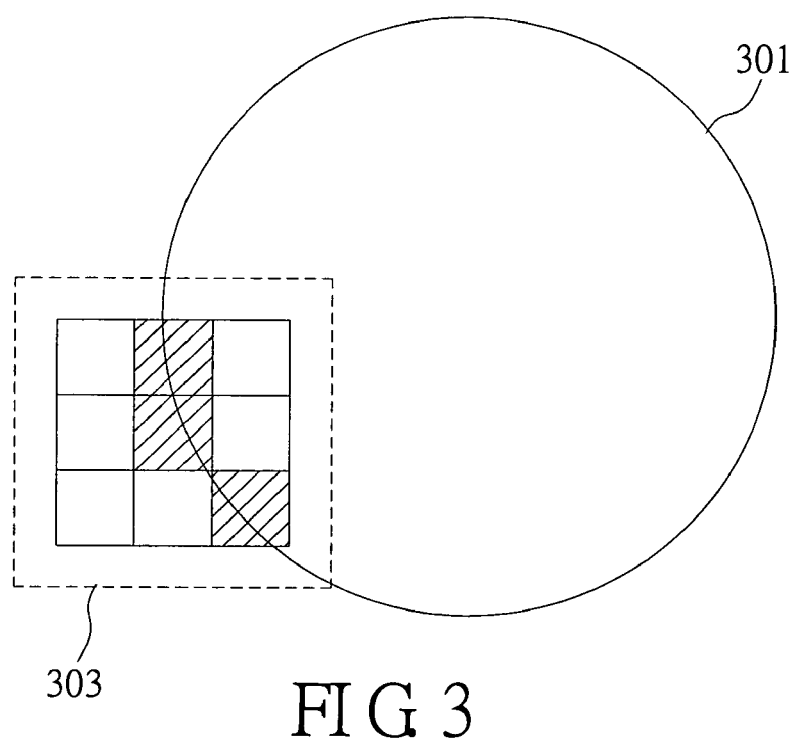
FIG. 3 shows a diagram illustrating an image and a searching window.

FIG. 3 shows a diagram illustrating an image and a searching window. Please refer to FIG. 3. Assuming in a frame there is an image 301, while there is also a searching window 303 located at a lower right corner. In the present invention, the position of the searching window 303 can be randomly chosen by the system, over which the present invention does has no restrictions.

When the present invention applies SAD operations onto the current frame and the pre-frame, it will choose pixels on image edges of macro blocks to perform SAD operations first, then on any remaining macro blocks. The present invention thereby allows fast searching for the minimal SAD threshold value, hence it accelerates a process speed of the present invention.

Figure 4:
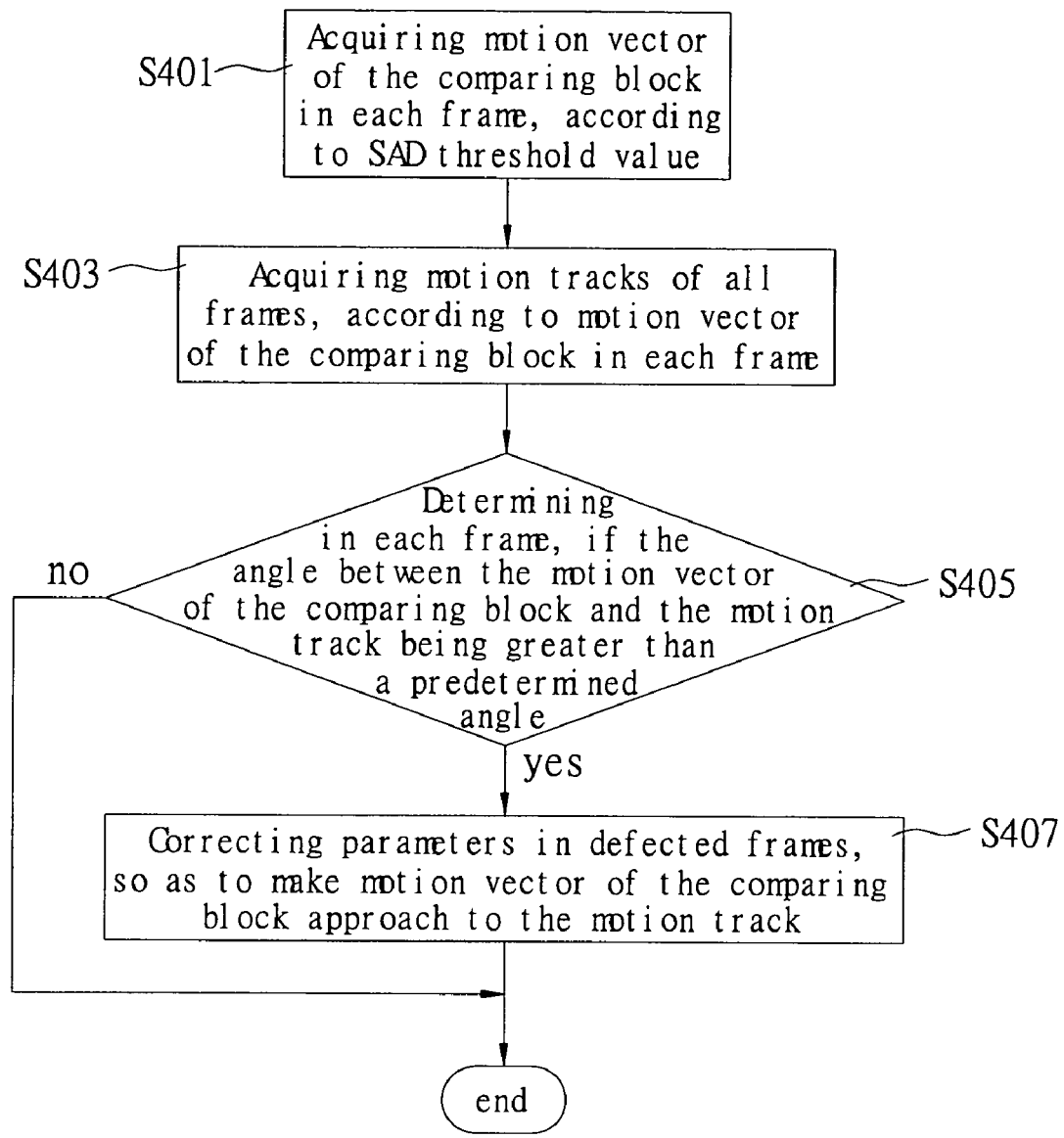
FIG. 4 shows a step flowchart of the method for computing motion tracks of a frame and track filtering, in accordance with one preferred embodiment of the present invention.

FIG. 4 shows a flowchart of the method for computing motion tracks of a frame and track filtering, in accordance with one preferred embodiment of the present invention. Please refer to FIG. 4, in which after the present invention has acquired the minimal SAD threshold value between two frames, it will, as illustrated in Step S401, obtain the motion vector of a comparing block in each frame according to the SAD threshold value.

Figure 5:
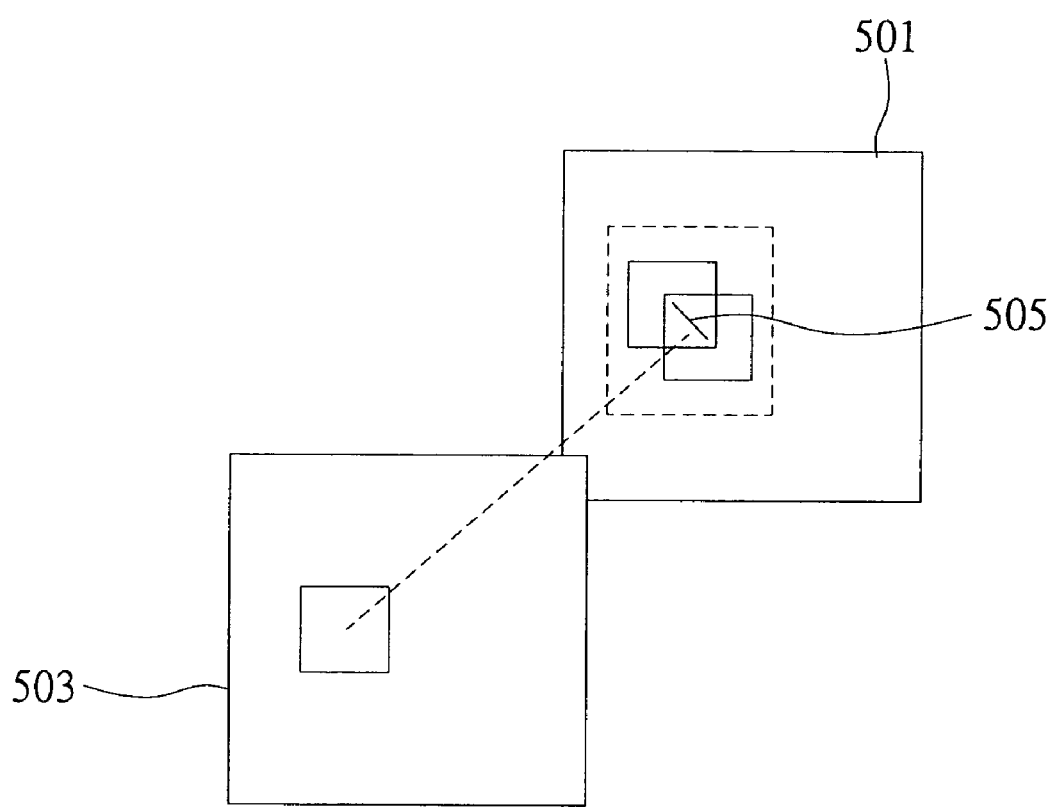
FIG. 5 shows a diagram illustrating the motion vector of a comparing block.

FIG. 5 shows a diagram illustrating the motion vector of a comparing block. Please refer to FIG. 5, where 501 represents a pre-frame, while 503 specifies a subsequent frame. Upon finding the minimal SAD threshold value, it is possible to locate the position of the same macro block in these two respective frames, and to calculate the motion vector thereof, as indicated by the arrow 505.

Please refer again FIG. 4, in which, as illustrated in Step S401, as soon as the present invention has acquired the motion vector of the comparing block, it is possible to perform Step S403. That is, acquiring motion tracks of all frames based on a motion vector of comparing block in each frame. In the present invention, the purpose for obtaining motion tracks is so they may be used as bases for motion image corrections, and following statements can be referred to for detailed descriptions thereof.

After obtaining motion tracks, the present invention can determine, as illustrated in Step S405, if the angle between the motion vector of the comparing block and the motion track is greater than a predetermined angle in each frame. Assume in the kth frame, the angle between the motion vector of the comparing block and the motion track is greater than a predetermined angle. Thus, the present invention concludes that, upon capturing the kth frame, this frame taken was affected due to factors such as hand trembling. Therefore, the present invention will correct parameters of the defected frame, as illustrated in Step S407. That is parameters of the kth frame will be corrected, so as to let the motion vector of the comparing block approach the motion track. By doing so, the motion tracks can be smoothened, which enables more natural presentations for viewing.

However, under certain circumstances, e.g. where special effects are required, it is possible to encounter situations in which cameras will be shaking considerably while shooting motion images. Therefore, the present invention allows users to set the above-mentioned predetermined angles by themselves. Thus the motion vectors generated originally due to special effects will not be filtered out.

In summary, the present invention provides at least the following advantages:

1. Since the present invention adopts digital approaches to process motion images, it does not require considerable expenses.

2. When the present invention perform SAD operations, the comparing block will perform SAD operations first on pixels over image edges within macro blocks in the searching window, and while SAD operations are performed on the comparing block and macro blocks in the searching window, as soon as it becomes greater than the SAD threshold value, SAD operations will be terminated immediately, the present invention thus reduces computation time.

3. Because the present invention will correct motion images based on the angle between the motion vector of the comparing block and the motion track, it allows the frames to look more natural.

4. The present invention also enables user to set above-mentioned predetermined angles themselves, hence allowing the present invention to provide more flexibility.

The present invention though has been disclosed in accordance with the preferred embodiments in previous descriptions, they are in every aspects not intended to limit the present invention; any skilled persons in the art can certainly make changes and modifications without departing from the spirits and ranges of the present invention, thus the claimed scopes of the present invention should be considered as such defined by the appended claims.

What is claimed is:

1. A method for processing motion images, such motion images having a plurality of consecutive frames, and each of said plurality of consecutive frames comprises a plurality of pixels, wherein said process method comprises:

receiving in a processor each of said plurality of consecutive frames sequentially;

dividing each of said plurality of consecutive frames into a plurality of macro blocks, and for each plurality of macro block there is a first predetermined number of pixels;

defining one of said plurality of macro blocks in a pre-frame as a comparing block;

calculating a Sum of Absolute Differences (SAD) threshold value by performing SAD computations on said pixels in said comparing block and pixels over image edges within one of said plurality of macro blocks in a searching window of a current frame, wherein said searching window contains a predetermined number of said plurality of macro blocks;

calculating a final operation value by performing SAD computations on the pixels in the comparing block and the pixels in a next macro block that have not yet undergone SAD computations within the searching window; wherein, while performing said SAD computations to obtain said final operation value, an ongoing operation value is obtained by summing of SAD values generated when SAD computations are performed on said next macro block;

whereby during the SAD computations, if the ongoing operation value becomes greater than or equal to said SAD threshold value, immediately suspending the SAD computations for said next macro block before computing the final operation value; otherwise, updating said SAD threshold value with the final operation value;

acquiring a motion vector of the comparing block in each of said current frames and pre-frames according to the SAD threshold value;

acquiring a motion track of all frames according to the motion vector of the comparing block in each of said current frames and pre-frames;

determining in each of said current frames and pre-frames, whether the angle between the motion vector of the comparing block and the motion track is greater than a predetermined angle; and adjusting parameters of the current frames and pre-frames if, in any one of said current frames and pre-frames, the angle between the motion vector of the comparing block and the motion track that is greater than the predetermined angle, so as to make the motion vector of the comparing block approach the motion track, and to smoothen the motion track.

2. The method for processing motion images of claim 1, wherein the predetermined angle can be set by a user.

* * * * *